No. 802,706. PATENTED OCT. 24, 1905.
G. W. PEARSON.
BALING PRESS.
APPLICATION FILED MAY 19, 1904.
3 SHEETS—SHEET 1.
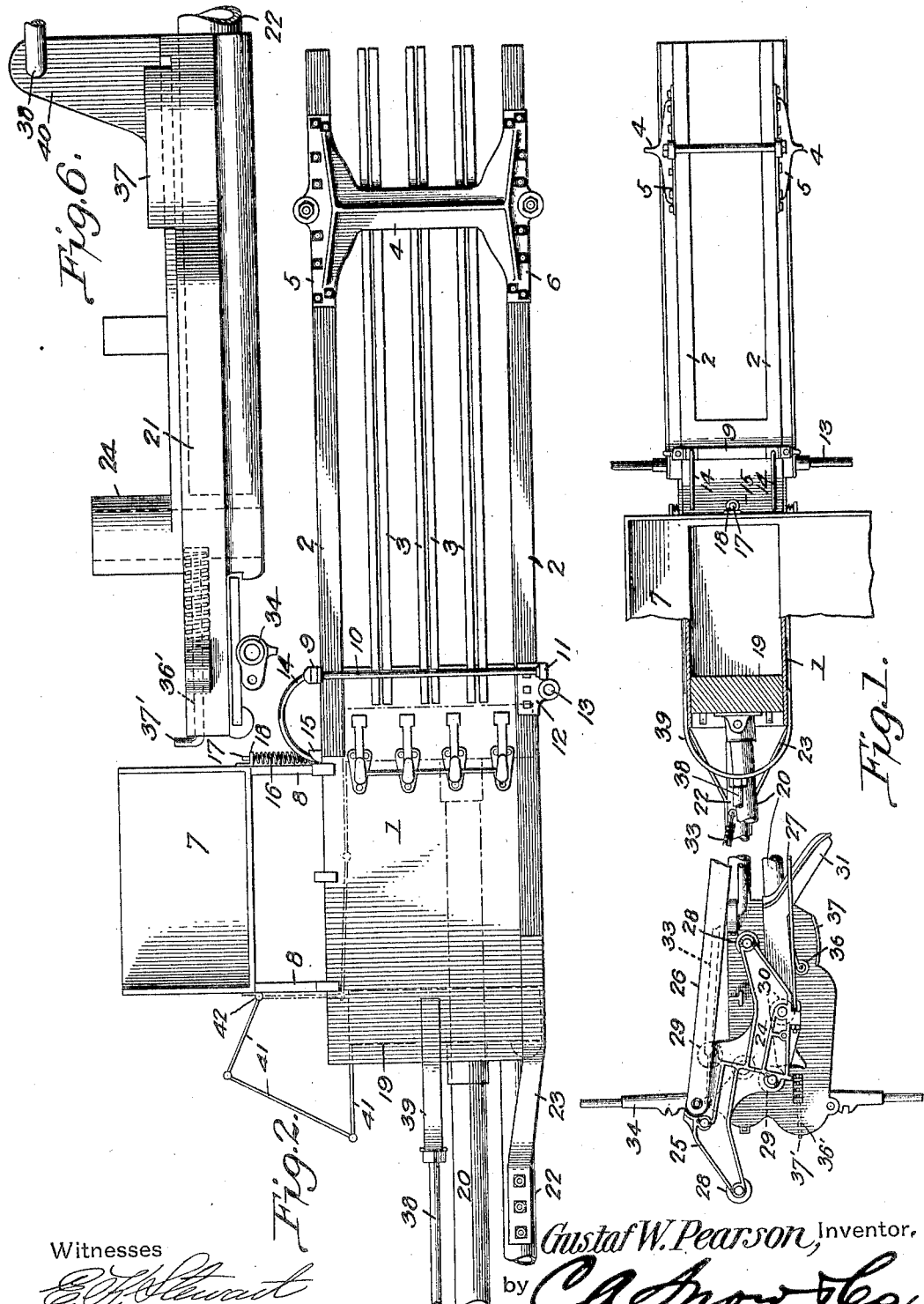
Witnesses
Gustaf W. Pearson, Inventor,
by C. A. Snow & Co,
Attorneys

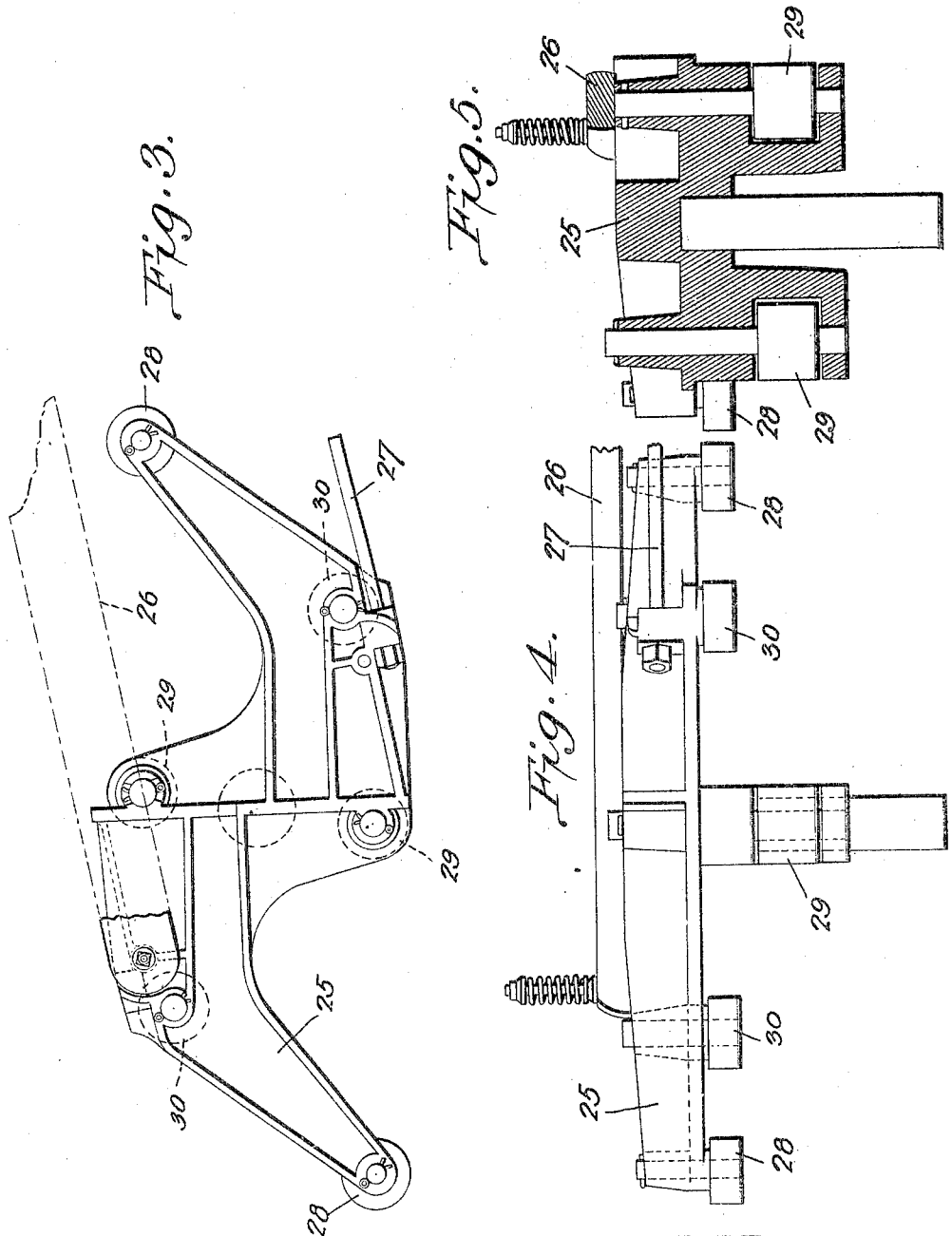

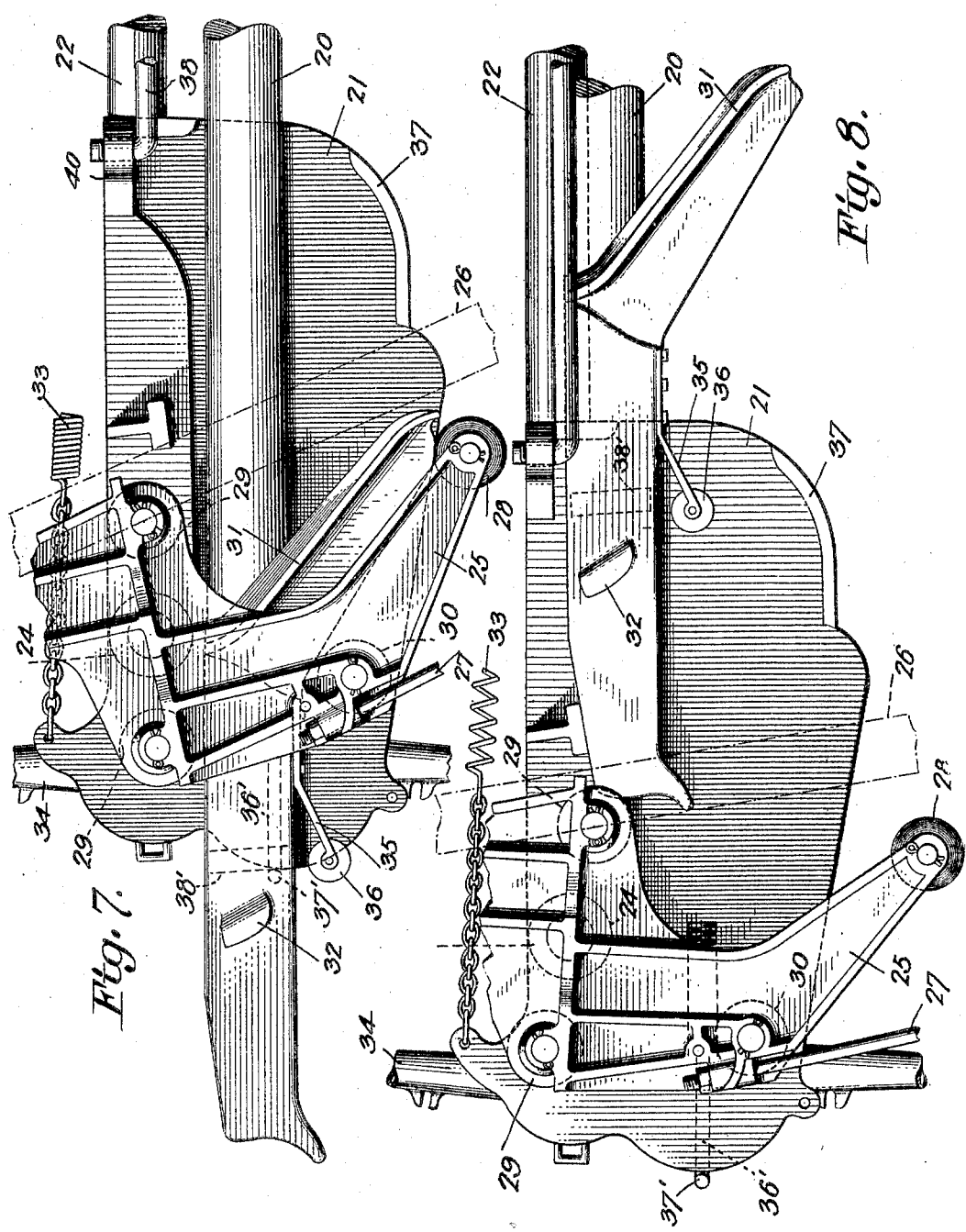

UNITED STATES PATENT OFFICE.

GUSTAF W. PEARSON, OF FRESNO, CALIFORNIA.

BALING-PRESS.

No. 802,706.  Specification of Letters Patent.  Patented Oct. 24, 1905.

Application filed May 19, 1904. Serial No. 208,758.

*To all whom it may concern:*

Be it known that I, GUSTAF W. PEARSON, a citizen of the United States, residing at Fresno, in the county of Fresno, State of California, have invented a new and useful Baling-Press, of which the following is a specification.

This invention relates to baling-presses of the rebounding-plunger type, and has for its object to provide novel mechanism whereby the stroke of the plunger is materially increased and the speed of the plunger and the leverage of the power is varied to suit the varying resistance of the hay or other material under treatment.

Other objects of the invention reside in materially simplifying the mounting of the power, so as to obviate a complicated arrangement of braces and to maintain the sweep, cross-head, axle, hub, and power-arms in proper operable condition, to brace the baling-chamber in a simple and improved manner against the strains of the plunger, to brace the rear end portion of the baling-chamber, so as to prevent sagging thereof under the weight of the bale, and to provide novel tucker mechanism, which is arranged for effective operation and to prevent the same from being choked by accumulations of seed, chaff, dirt, and the like.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a plan view of a baling-press embodying the features of the present invention. Fig. 2 is an enlarged elevation of the baling-chamber. Fig. 3 is an enlarged detail plan view of the power for actuating the plunger. Fig. 4 is an edge elevation of the rotary power-head. Fig. 5 is a detail sectional view taken through the power-head to show the mounting thereof. Fig. 6 is a detail view of the bed-plate for the support of the power, the latter being removed. Figs. 7 and 8 are enlarged detail plan views, showing the relative positions of the power-head of the plunger-rod in the initial and final stages of the operation of the press.

Like characters of reference designate corresponding parts in each and every figure of the drawings.

The present machine includes a feed box or chamber 1, which is open at its top for the reception of the material to be baled and open at its rear for the discharge of the material into the baling-chamber, the front of the box being open to receive the plunger. The baling-chamber is made up of upper and lower longitudinal frame-bars 2, preferably in the nature of angle-bars, with a plurality of longitudinally-disposed T-bars 3 located between the upper and lower frame-bars, all of the bars, of course, having their front ends connected to the rear end of the feed-box. Adjacent the rear end of the baling-chamber and at each side thereof there is a truss member 4 in the nature of a casting, including an upright or standard and upper and lower arms 5 and 6, which latter are bolted or riveted to the upper and lower frame-bars 2, thereby to support the chamber and prevent sagging thereof under the weight of one or more bales. The standard and arms of this truss-brace are provided upon their outer faces with longitudinally-disposed strengthening-ribs, so as to render the truss sufficiently strong and at the same time relatively light.

A suitable feed-chute 7 is supported above the open top of the feed-box 1 by suitable standards or brackets 8, rising from the top of the box. In rear of the feed-chute and extending across the top of the feed-box is a cross-bar 9, which has its ends projected beyond the feed-box and pierced by an upright tie-rod 10, the lower end of which pierces an ear 11, carried by a bracket 12, secured to the adjacent lower frame-bar 2 for the support of an axle 13. A pair of arched or bowed arms 14 are pivotally supported upon the cross-bar, and a tucker-bar 15 is carried by the free ends of the bars in a position to work downwardly into the open top of the feed-box, at the rear edge thereof, there being a tension device in the nature of a helical spring 16, embracing a guide-stem 17, rising from the middle of the tucker-bar and working through a guide-bracket 18, carried by the back of the feed-chute 7.

The plunger 19, which works through the feed-box 1, is of any common or preferred form and is provided with a plunger-rod 20, which is preferably tubular in form. For the support of the outer free end of the plunger-rod there is a bed-plate 21, which is connected to the frame of the baling-chamber by means of a bar 22, which is provided at its rear end with a yoke 23, embracing the bottom of the front portion of the feed-box and suitably connected to the two lower frame-bars 2.

Located at one side of the rebounding-path of the plunger-rod 20 and rising from the forward portion of the bed-plate 21 is a post 24, upon which a horizontal substantially S-shaped rotary power-head 25 is mounted and designed to be rotated by means of a sweep made up of the outwardly-converged bars 26 and 27, to the outer ends of which (not shown) is hitched the team for operating the press. At each extremity of the rotary power-head 25 is a pendent antifriction-roller 28, and other pendent antifriction-rollers 29 are carried by the head, at diametrically opposite sides of the axis thereof, and alined at substantially right angles to a line drawn through the two rollers 28. Between each pair of rollers 28 and 29 is another roller 30, whereby each half of the rotary head is provided with a series of three antifriction-rollers located at increasing distances from the axis of the head and disposed for successive engagement with the plunger-rod, so as to vary the leverage of the power applied to the latter in the manner as will now be described.

Upon the top of the plunger-bar and adjacent the free end thereof there is a cam 31, which inclines forwardly and extends at the right-hand side of the plunger-rod when looking toward the baling-chamber from the power end of the press and lies in position for engagement by that terminal roller 28 of the rotary head which is approaching the cam, so that as this roller wipes past the cam the plunger-rod will be moved forwardly with a relatively quick movement. When this roller 28 is about to leave the inner or rear end of the cam, the next roller 30 engages a second cam 32, located between the first-mentioned cam and the free end of the plunger-rod, it of course being understood that the power-head swings across the top of the plunger-rod. When the roller 28 disengages from the cam 31 and the roller 30 comes into engagement with the cam 32, the plunger-rod will be moved forwardly at a less rate of speed, but under the influence of increased power, by reason of the fact that the point of engagement between the rotary power-head and the plunger-rod has been shifted inwardly toward the fulcrum or axis of the head, which has the effect of increasing the leverage upon the operating-sweep. When the roller 30 is about to leave the second cam 32, the next succeeding roller 29 comes into engagement with the free end of the plunger, and the latter is moved forwardly with decreased speed, but with increased power, until the roller 29 disengages the plunger-rod, whereby the latter rebounds under the influence of the spring 33, which is connected to the rear portion of the plunger-rod and to the front axle 34. Adjacent the cam 31 and in rear thereof there is a buffer-spring 35 connected to the plunger-rod and inclined outwardly therefrom, with an antifriction-roller 36 upon the outer free end thereof for engagement with an upstanding abutment 37 in the nature of a flange rising from the bed-plate, so as to prevent a too-wide lateral swing of the plunger when rebounding. After the rebound of the plunger the other outer roller 28 comes into engagement with the cam 31, and the plunger is again moved forwardly in the manner hereinbefore described, wherefore two operations of the plunger are obtained by a single continuous rotation of the operating-sweep.

To cushion the rebounding movement of the plunger, there is a spring-pressed buffer-rod 36', located upon the under side of the bed-plate 21, with its outer end provided with an upstanding shoulder or abutment 37', rising above the top of the bed-plate in the path of the shoulder 38' upon the under side of the plunger-rod, whereby engagement of said shoulder with the abutment yieldably limits the rebounding movement of the plunger, so as to prevent the latter from becoming displaced from the feed-box of the press.

In order to prevent buckling of the bar 22, which connects the bed-plate 21 with the feed chamber or box 1 of the press, there is a brace 38, provided at its rear end with a yoke or fork 39, embracing and secured to the front end of the box 1 with its forward end hooked and engaged with an upstanding ear or shoulder 40, rising from the rear end of the bed-plate.

Upon reference particularly to Fig. 2 of the drawings it will be noted that the open top of the feed-chamber is closed when the plunger 19 is at its rear limit by means of a closure device or apron made up of a series of jointed sections 41, one of which is connected to the top of the plunger and another hinged to the bottom of the front portion of the feed-chute 7, as at 42, whereby the closure or apron is capable of working back and forth with the plunger. When the plunger is at its forward limit, the apron or closure assumes the position shown by dotted lines, so as to close the open top of the feed-box against the dropping of hay into the box in rear of the plunger, said apron being moved to the position shown in full lines when the plunger rebounds, thereby to leave the open top of the box unobstructed for the introduction of the material to be baled.

Having fully described the invention, what is claimed is—

1. In a baling-press, the combination of a plunger and a rotary power-head having a series of contact elements disposed at progressively-decreasing distances from the axis thereof, the plunger being provided with a relatively long transversely-inclined cam located in the path of the outermost contact element, a second cam located between the first-mentioned cam and the free end of the plunger for engagement by the second contact of the head, and the free extremity of the plunger being formed for engagement by the innermost contact member of the power-head.

2. In a baling-press, the combination with a rebounding plunger, of a spring-buffer carried by and projected laterally from the plunger, and an abutment disposed for contact by the buffer to limit the lateral swing of the plunger during the rebounding thereof.

In witness whereof I have signed my name to this specification in the presence of two subscribing witnesses.

GUSTAF W. PEARSON.

Witnesses:
ROBERT HARTSEL SROUCE,
AUGUST. H. SCHULZ.